United States Patent Office 2,924,732
Patented Feb. 9, 1960

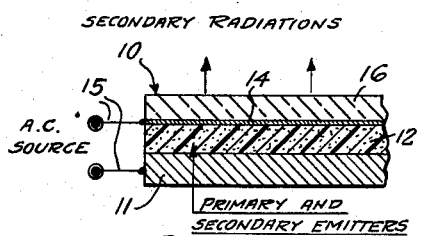
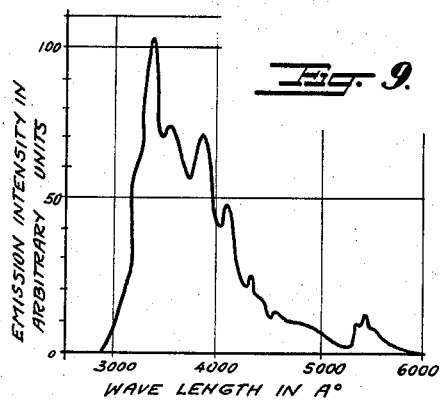
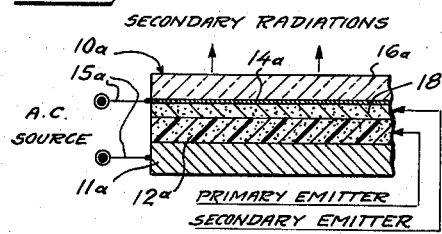
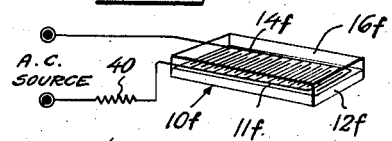
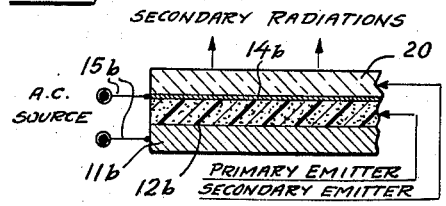
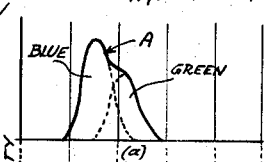
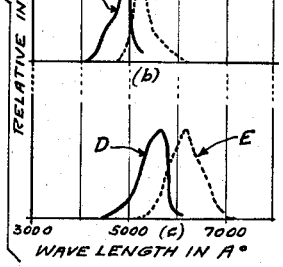
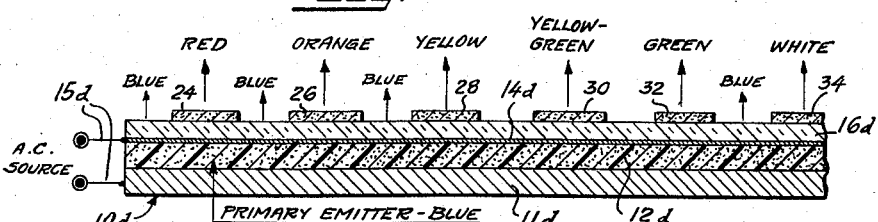
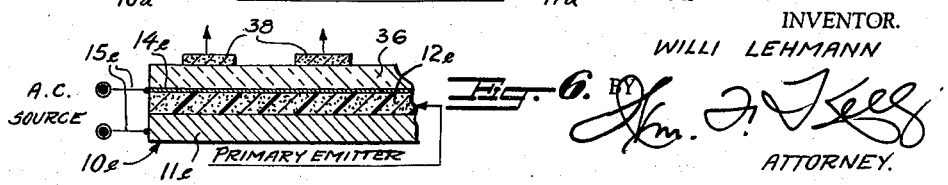
INVENTOR.
WILLI LEHMANN
ATTORNEY.

2,924,732
AREA-TYPE LIGHT SOURCE
Willi Lehmann, Livingston, N.J., assignor to Westinghouse Electric Corporation, East Pittsburgh, Pa., a corporation of Pennsylvania Application July 5, 1957, Serial No. 670,270
14 Claims. (Cl. 313—108)

This invention relates generally to an area-type light source and, more particularly, to such sources which will efficiently produce light of the desired brightness and color, especially red, when operated from a low-frequency or variable frequency A.C. power source, and to a method for efficiently producing longer wavelength radiations from an area-type source.

Area-type light sources, that is, those in which the light-generating and emitting area greatly exceeds the thickness of the source, have been developed wherein a selected phosphor material is disposed between two electrodes which phosphor material under the influence of a varying electric field is caused to electroluminesce or generate visible radiations of a characteristic wavelength or wavelengths, depending upon the type of phosphor employed and the nature of the applied voltage. Since the phosphors used in electroluminescent cell structures of this type are responsive to a varying electric field to produce light, they may be termed "field-responsive" by which designation they will be hereinafter identified. Electroluminescent light sources of this character are well known and were first summarized in an article by G. Destriau entitled "The New Phenomenon of Electrophotoluminescence," Edinburgh and Dublin Philosophical Magazine, series 7, volume 38, No. 285, pages 700–737 (October 1947).

The color of the light produced by an electroluminescent cell is primarily dependent upon the type of phosphor used and in certain instances can be varied by simply changing the frequency of the applied A.C. voltage. Colors other than those characteristic of single phosphors can, of course, be obtained by blending two or more phosphors having different emission characteristics and additively mixing the colors or by using a color filter in conjunction with a phosphor to obtain the desired emission by the subtractive method. While phosphors which are strongly electroluminescent in the green to blue to yellow regions of the spectrum are known, there has not heretofore been developed or discovered an electroluminescent phosphor which will generate a red emission of high saturation and brightness, especially with low or variable-frequency field excitation.

Electroluminescent materials which emit over a broad range of colors including red are known, but have proven impractical as red-emitting light sources either because a red-transmitting filter or extremely high-frequency excitation is required to obtain a red emission of the desired purity, color-saturation and brightness. For example, zinc sulfide phosphor activated with manganese or with copper and manganese has a broad emission spectrum which, while predominantly yellow, contains a certain amount of red emission that can be separated by means of a red-transmitting filter to provide red light of high purity and saturation. However, since the greater part of the light generated by the phosphor will unavoidably be absorbed by the filter, the efficiency of generation and the brightness of the red emission obtained are drastically reduced rendering this arrangement inherently impractical. Similarly, copper-activated zinc sulfide phosphor prepared in the manner described in U.S. Patent No. 2,660,566 to Froelich electroluminesces with a pink or lavender color which includes an appreciable amount of orange-red emission but, as pointed out by the patentee, a red filter must be used if a strong pure red emission is desired thus complicating the construction of the source and greatly reducing its efficiency. Zinc selenide, activated with copper and coactivated with chlorine, on the other hand, is red emitting of itself but the frequency of the field excitation must be in the order of 10 kilocycles or higher before a brightness level of any magnitude can be attained thus rendering this type phosphor unsuitable for use with most power sources.

In the absence of a pure red-emitting low-frequency-responsive electroluminescent phosphor, or other means utilizing the phenomenon of electroluminescence and capable of efficiently and conveniently generating radiations in the deep red region of the spectrum, it has heretofore been impossible to construct an area-type source which would produce a truly white light at the lower-frequencies insofar as the color spectrum of the light produced has always been deficient in the red and overly rich in the green or blue. For many applications, it is not only desirable but mandatory that a white light be utilized wherein the red emission is sufficent to balance the other colors and permit a more or less homogeneous blending of colors. For example, a color-corrected white light of this character is essential when illuminating color transparencies or the like insofar as any deficiency in the red region of the spectrum drastically alters the color rendition of the red values in the print making them appear brown or violet to the eye thus preventing, for all practical purposes, the use of the heretofore-available electroluminescent sources in this or similar-type applications.

It is accordingly the general object of the present invention to provide a simple and novel mode of efficiently producing visible radiations of the desired color and brightness utilizing a field-responsive phosphor material that generates radiations of a totally different spectral character.

A more specific object of the invention is to provide an area-type light source which may be operated from a low or variable frequency A.C. power source to generate red light of high brightness and color saturation.

Another object of this invention is to provide an area-type light source which will efficiently generate a red emission of high brightness and color-saturation without the use of a color filter.

Still another object of the invention is to provide an area-type light source which will efficiently generate a color-corrected white light and which can be easily adapted to produce visible radiations in different portions of the spectrum and according to selected patterns to form a multicolor indicium suitable for decorative or advertising purposes.

A further object of this invention is to provide a method of conveniently and efficiently producing from an area-type source, visible radiations in preselected regions of the spectrum utilizing electroluminescent phosphors which emit in different spectral regions.

The foregoing objects, and others which will become obvious to those skilled in the art as the description proceeds, are achieved by combining with an electroluminescent cell additional material or materials of such character that when subjected to the radiations generated by the electroluminescent phosphor they become photo-excited and fluoresce to produce secondary radiations of a different wavelength. This method of light generation is, in effect, a two-stage conversion process wherein electrical energy is first transformed by means of the phenomenon of electroluminescence into primary radiations which are then translated by means of a photoluminescent material into secondary radiations of a selected longer wavelength in accordance with Stoke's law. In this manner a "cascade" type of excitation is effected which causes the selected materials to sequentially translate, by means of electro and photoluminescence, electrical energy into radiant energy of the desired character.

A better understanding of the invention may be obtained by referring to the accompanying drawing wherein:

Fig. 1 is a fragmentary cross-sectional view on an enlarged scale of an area-type light source according to one form of the present invention wherein the electroluminescent and fluorescent materials are admixed and incorporated into an electroluminescent cell of the conventional design;

Figs. 2, 3, 4, 5 and 6 are views corresponding to that shown in Fig. 1 but illustrate alternative embodiments of the invention wherein the fluorescent material is separately incorporated into or forms a part of an electroluminescent cell of slightly modified design;

Fig. 7 is a perspective view showing another alternative embodiment of the invention wherein a grid-like electrode assembly is employed;

Fig. 8 illustrates graphically the emission characteristics of an electroluminescent material which may be utilized and the emitting and absorbing spectra of fluorescein and rhodamine B, respectively, which when admixed are especially adapted for use therewith as a composite fluorescent material to provide a "three-stage" type excitation according to one embodiment of the invention;

Fig. 9 is a graph illustrating the emission characteristics of another electroluminescent material which may be used according to the invention.

In its broad aspect, the invention contemplates the utilization of selected materials, either of organic or inorganic nature, which can be conveniently incorporated into an electroluminescent lamp structure in receptive proximity to the phosphor material thereof and, when so disposed, are excited by the radiations, whether visible or invisible, generated by the said electroluminescent phosphor to fluoresce and produce visible radiations in preselected longer wavelength portions of the spectrum. By properly selecting and combining the electroluminescent phosphor and the fluorescent material or materials and incorporating them as an integral part of an electroluminescent cell, visible radiations of the desired character as regards color and brightness may be conveniently and efficiently produced by means of an area-type structure thus permitting the utilization of electroluminescent phosphors already known in the art to obtain, in a unique and advantageous manner, a very useful and heretofore unattainable result. The foregoing transformation of radiant energy from one form into a more useful form may be effected in a variety of ways according to the invention, depending upon the nature of the materials used and the color or spatial arrangement of the light desired, as will be evident from the specific embodiments illustrated in the drawing and hereinafter described.

EMBODIMENT I

In Fig. 1 there is shown one form which the present invention may take wherein the area-type light source 10 comprises generally a pair of spaced electrodes 11 and 14 of generally flat configuration having sandwiched therebetween an admixture of a suitable low-frequency-responsive electroluminescent phosphor and a fluorescent material of such character that it is easily and efficiently excited by the radiations generated by the field-responsive phosphor and emit the desired type of visible radiations, which admixture constitutes a light-generating core or layer 12. Inasmuch as the electroluminescent phosphor must first be excited and give off radiations which are thereafter converted into radiations of a longer wavelength, the electroluminescent phosphor material will hereinafter be referred to as the primary emitter and its radiations as primary radiations. Similarly, inasmuch as the fluorescent or photoluminescent material is sequentially excited by the primary radiations, said fluorescent material will hereinafter be referred to as the secondary emitter and its radiations as secondary radiations.

As illustrated in Fig. 1, the admixed primary and secondary emitting substances are desirably embedded in a suitable light-transmitting dielectric material such as polyvinyl-chloride acetate or a ceramic material such as glass. However, the admixture may be merely compacted between the electrodes 11 and 14 without a dielectric binding medium, if desired, providing the secondary emitting substance fluoresces when in powder form and a separate layer of dielectric material or some other means is used to prevent arcing across the electrodes. The purpose of the dielectric material is to prevent an electrical breakdown between the electrodes through the field-responsive phosphor material. In some cases the dielectric may be dispensed with, as for example, where the electric fields utilized are not particularly intense. Some phosphors can withstand fields as high as 100 kv./cm. without breakdown. For the usual application, however, the use of a dielectric either in admixed form or as a separate layer between the electrodes is desirable.

In order to permit the utilization of the light generated within the area-type source 10 shown in Fig. 1 it is, of course, necessary that at least one of the electrodes 11 or 14 be light-transmitting. The electrode 14 may comrpise a thin coating of light-transmitting electrically-conductive material such as tin oxide which may be deposited on the inner surface of a glass plate 16 in accordance with any of the well-known techniques, whereas the electrode 11 may be fabricated from an opaque sheet of suitable metal such as aluminum. The light-transmitting electrode 14 may also be fabricated of oxides of cadmium, barium or aluminum, for example. The plate 16 in this type construction thus serves as the light-transmitting face or side of the light source 10. Alternatively, the electrode 11 may be constructed in the same manner as electrode 14 in which case both sides of the source would emit light. Each of the electrodes 11 and 14 are connected with a suitable A.C. power source by leads 15, which sources are well-known.

Any electroluminescent phosphor capable of low-frequency field excitation may be utilized as the primary-emitting material, providing only that the primary radiations produced are of shorter wavelength than the secondary radiations desired and are capable of exciting the secondary-emitting substance. The term "low-frequency" as here employed refers to the range of frequencies from about 50 c.p.s. to about 5 kc. Thus, if secondary radiations in the red region of the spectrum are desired, then any electroluminescent phosphor which when subjected to a field excitation in the 50 c.p.s. to 5 kc. range emits in the ultra-violet (UV) portion of the spectrum or up to and including the yellow-orange may be utilized as the primary emitter in combination with a secondary emitter which is excited by such radiation to fluoresce and emit red light of the desired saturation and brightness. One example of a UV-generating material suitable for use as a primary emitter is electroluminescent boron-nitride which is described by S. Larach and R. E. Shrader, Physical Review 102 (1956), page 582. As shown in Fig. 9, the emission band of boron-nitride is rather complex and extends from about 3000 A.U. to about 5500 A.U. with a peak of intensity in the near UV (approximately 3400 A.U.). A specific example of a red-responsive material suited for use as a secondary emitter in combination with a UV-generating phosphor such as boron-nitride is magnesium fluorogermanate phosphor described and claimed in U.S. Patent No. 2,748,303 entitled, "Color-Corrected Light Source and Phosphor Therefor," issued to L. Thorington. As disclosed by the patentee, magnesium fluorogermanate has a high output in the red spectral region when acted upon by UV radiations thus making it ideal for use in the present application. In addition, since both materials are almost white as regards body color, the mixture will have a whitish body color yet will emit red during electroluminescence, which combination of properties makes this particular selection of materials admirably suited for use in lighting the instrument dials of airplanes and the like. Other examples of suitable inorganic phosphors which emit in the red spectral region under UV excitation and have a substantially whitish body color are manganese-activated magnesium oxide, manganese-activated magnesium arsenate, barium-strontium-lithium silicate activated by cerium and manganese, tin-activated strontium-zinc phosphate, and aluminum oxide activated by chromium.

Other materials which may be combined in accordance with the principles of this invention to provide an area-type lamp that produces red light of high brightness and saturation are yellow-emitting zinc-manganese sulfide phosphor activated with copper and coactivated with chlorine as the primary emitter and the organic dye rhodamine B as the secondary emitter. The absorption and emission spectra of rhodamine B are illustrated by curves D and E, respectively, in Fig. 8c. As shown by curve D, rhodamine B absorbs visible radiations from the blue up to and including the yellow-orange (4800–6000 A.U.) and emits (curve E) in the red spectral region. Moreover, it is best excited by radiations in the yellow-green (5500 A.U.) region of the spectrum and may have a quantum efficiency of nearly 100%, depending on the concentration, so that the conversion from yellow to red, in the instant case, can be accomplished with a minimum loss of energy. This particular combination is especially useful since a red light of excellent brightness and purity is produced at all frequencies and voltages. Rhodamine B is soluble in the well-known thinning agents used with certain plastic dielectrics, such as an acetone thinning agent, so that the rhodamine B can be conveniently dispersed in a light-transmitting plastic dielectric, with or without the primary emitter, as will be hereinafter more fully described.

Specific examples of other materials which can be excited by long UV or visible radiation having wavelengths shorter than the red and utilized as secondary emitters to produce strong red secondary radiations of high brightness are rubren, pentacen, azaline, crystal violet and violanthren as organic materials and zinc-cadmium sulfide activated with silver or copper as inorganic substances.

The invention is not limited to the production of secondary radiations in the red portion of the spectrum only, but may be utilized to transform any primary radiation to secondary radiations of any color in accordance with the basic requirement of Stoke's Law, namely, that the primary wavelength be shorter than that of the secondary. Hence, electroluminescent light in the UV to violet to blue spectral regions may be converted into green, blue or green light into yellow, etc. As specific examples of some of the other transformations which are possible, any of the following organic substances or mixtures thereof, in combination with any electroluminescent primary emitter that generates under low-frequency excitation radiations of shorter wavelength than the selected secondary radiation (such as blue-emitting copper-activated zinc sulfide for example), may be used as secondary emitters to produce the color indicated:

Table I

| Material | Color of Emission |
| --- | --- |
| auramine | yellow-green. |
| rhodamine G and auramine (base) | yellow. |
| thioflavine | green. |
| rhodamine B and auramine (base) | orange. |
| primuline | blue-green. |
| rhodamine, auramine and primuline | white. |

It is also possible to obtain a "three-stage" type excitation by utilizing as the secondary emitter a mixture of two fluorescent materials having different absorption and emission spectra. For example, where the primary emitter is a phosphor which electroluminesces in a broad emission band, or in two or more emission bands covering a broad range of the spectrum, then a plurality of secondary-emitting materials whose absorption and emission spectra overlap to span the entire emission of the primary emitter may be combined to convert all of the primary radiations, regardless of their wavelengths, into secondary radiations of a different color. As a specific example, copper-activated zinc sulfide may have an electroluminescent emission which extends from the violet into the yellow with one peak of intensity in the blue and another in the green, as shown by curve A in Fig. 8a. According to this embodiment of the invention, the yellow-green primary radiations will be efficiently converted in the manner heretofore described into red secondary radiations by a material such as rhodamine B, for example, since the latter material has a strong absorption band (curve D in Fig. 8c) in this region of the spectrum and emits (curve E) in the red region. As will be evident from curve D, however, the absorption of rhodamine B in the blue (about 4500 A.U.) is very weak so that by itself it is capable of transforming only a very small portion of the blue primary radiations into red. This deficiency is overcome according to this mode of the invention by admixing with the rhodamine B an additional fluorescent material, such as an approximately equal amount by weight of the organic compound fluorescein, for example. As shown in Fig. 8b, fluorescein has a strong absorption band (curve B) in the blue and emits (curve C) in the yellow-green (5000–6000 A.U.) so that virtually all the blue primary radiations are transformed by the fluorescein into "transient" or intermediate yellow-green radiations which are then converted along with the primary yellow-green radiations into red secondary radiations by the rhodamine B.

As another specific example of materials suitable for use in achieving a "three-stage" type excitation, blue-emitting zinc sulfide activated by copper may be utilized as the primary electroluminescent phosphor in conjunction with naphtacene (or anthacene containing a contamination of naphtacene) as one of the fluorescent secondary-emitter materials, and pentacen as the other secondary-emitter. Inasmuch as the blue emitting zinc sulfide has an emission band between about 4000 to 5000 A.U., while the naphtacene or the mixture of anthracene and naphtacene have an absorption peak in the violet-blue spectral region (about 4300 to 4400 A.U.) and an emission peak in the green (from about 5300 to 5400 A.U.) and pentacen has an absorption peak in the green at approximately 5400 A.U. and emits in the red, it will be seen that the blue primary radiations will be first converted to green and then to red in the same manner as previously described. Other fluorescent materials having the proper absorption and emission characteristics may be employed to achieve a "multiple-stage" type cascade-excitation as set forth in the foregoing examples. Thus, by properly blending selected fluorescent materials to constitute a composite secondary emitter, it is possible to convert all of the primary radiations, regardless of their bandwidth, into preselected secondary radiations of the desired color and brightness.

Alternatively, if ony a red-emitting fluorescent material such as rhodamine B is employed as the secondary emitter in combination with a multicolor primary emitter such as electroluminescent copper-activated zinc sulfide, the predominant color of which shifts from green to blue with increasing frequency, and the concentration of the secondary emitter is carefully adjusted, then the degree of transformation of the primary radiations will vary depending upon the ability of the secondary emitter to absorb and convert them. As a result, at the lower frequencies of excitation (up to about 200 c.p.s.) where the primary radiations are predominantly green, most of the green primary radiations will be absorbed by the rhodamine B and converted into red secondary radiations, thus providing a mixture of small amounts of blue and green emission with a larger amount of red which mixture will appear yellowish-white to the eye. As higher frequencies are reached (up to about 5 kc.) the intensity of the blue primary radiations increase until a more balanced mixture of red, green and blue occur to produce color-corrected white light. As the frequency is increased even further (above 5 kc.), the intensity of the blue primary radiations greatly exceed that of the green thus producing a mixture of blue and red or lavender. Hence, by properly controlling the concentration of the rhodamine B and the frequency of the applied voltage, the normal green-blue shift of the primary emitter may be transposed and magnified, so to speak, to provide a more panoramic color shift which varies with increasing frequency from yellowish-white through white to lavender.

Another method of obtaining color-corrected white light is to employ the orange-red emitting zinc-cadmium sulfide phosphor activated with silver or copper or mixtures thereof in place of the rhodamine B in the preceding arrangement and carefully adjusting the concentration thereof in the admixture so that only a portion of the blue-green primary radiations are converted to red or orange-red. On the other hand, if rhodamine B or any other red-emitting fluorescent material is combined with a pure-green-emitting electroluminescent phosphor, that is, one which has no blue emission, such as zinc sulfide activated with copper and coactivated with aluminum, then a yellowish-white emission will be obtained at all frequencies.

It should be noted that where a "ceramic" type electroluminescent cell structure is utilized it is essential that the secondary emitter be inorganic since the intense heat required to fabricate such cells would char and completely inactivate the rhodamine or other organic materials.

EMBODIMENT II

According to another form of the present invention as shown in Fig. 2, the same-type electrodes 11a and 14a, face plate 16a and connecting leads 15a as those previously described relative to Fig. 1 may be employed. In this embodiment (Fig. 2), however, the layer 12a merely comprises an admixture of the primary-emitting material and a suitable light-transmitting dielectric whereas the secondary emitting material is deposited as a similarly formed but separate layer 18 sandwiched between the first layer 12a and the light-transmitting electrode 14a thus forming an area-type light source 10a having a heterogeneous light-generating core. Where the "ceramic" type cell construction is used, the secondary-emitting layer 18 may be baked into the primary emitter-bearing glass sheet 12a to form an enamelized surface in the well-known manner, providing the secondary emitter is an inorganic substance which can withstand the elevated temperatures required for such fabrication. The same combination of materials or mixtures thereof, given in connection with the embodiment shown in Fig. 1 above, may be utilized as primary and secondary emitters, depending upon the type of secondary radiations or light desired and the type of cell construction employed.

EMBODIMENT III

In the embodiment of the present invention as shown in Fig. 3, the area-type light source 10b may comprise generally the same basic components as those utilized in connection wtih the embodiment shown in Fig. 2 above, namely, a metallic electrode 11b, a light-transmitting electrode 14b, an electroluminescent primary emitter-dielectric layer 12b and connector leads 15b. In contrast to the previous structure (Fig. 2), however, a face plate 20 fabricated from fluorescent glass which contains a rare earth or uranium in solution, such as those described by P. Pringsheim and M. Vogel in "Luminescence of Liquids and Solids" (New York 1949), page 190, is utilized to thus combine in one element the functions of a protective covering and a secondary emitter. As a specific example, the primary emitter may comprise a blue-responsive electroluminescent phosphor such as copper-activated zinc sulfide and the face plate 20 fabricated from uranium-containing glass in which case the blue primary radiations upon impinging on the face plate 20 will cause the glass to fluoresce and emit secondary radiations in the yellow-green portion of the spectrum. Specific examples of rare earth-containing glasses which may be used and the colors with which they fluoresce are as follows:

| Glass | Color of Emission |
|---|---|
| samarium | orange-yellow. |
| europium | orange-red. |
| praseodymium | orange. |
| erbium | blue. |

Glasses of this type may be excited by any radiation having a shorter wavelength than the radiations emitted when the glass fluoresces so that any of the primary-emitting substances given relative to the embodiment shown in Fig. 1 or mixtures thereof which meet this requirement may be employed.

It will be obvious, of course, that a "three-stage" type excitation may be obtained by depositing an additional fluorescent material (not shown) on the outer surface of the fluorescent-glass face plate 20. For example, if a multicolor-emitting electroluminescent phosphor such as copper-activated zinc sulfide were utilized as the primary emitter in combination with a face plate 20 of yellow-green emitting fluorescent glass, such as one containing uranium, and a red-emitting coating (not shown) of fluorescent material which is strongly excited by yellow-green radiations, such as rhodamine B, then the primary radiations in the blue spectral region would be initially converted by the face plate 20 into yellow-green and thence by the fluorescent coating into red secondary radiations. Thus, all the primary radiations may be converted regardless of wavelength into secondary radiations of a selected longer wavelength in much the same manner as with the "composite secondary-emitter" arrangement described in connection with the embodiment of Fig. 1.

It will be equally obvious that the face plate 20 may comprise a glass plate in which a suitable inorganic secondary emitting substance has been embedded as in the well-known "ceramic" type electroluminescent lamp structures in which case the same advantages and beneficial results above-described will be attained.

EMBODIMENT IV

As illustrated in Fig. 4, still another area-type light source 10c is possible wherein a face plate 16c, electroluminescent primary emitter-dielectric layer 12c, metallic electrode 11c, light-transmitting electrode 14c and leads 15c are arranged as in the usual plastic or ceramic type of electroluminescent lamp structures. According to this form of the invention, however, the secondary emitter is deposited on the outer surface of the face plate 16c in the form of a layer 22 of substantially uniform thickness. The secondary emitting material may be dispersed in a suitable light-transmitting medium such as the well-known polyvinyl-chloride acetate lacquer to form a paint of such consistency that when applied, either in single or multiple coats, and cured will form a layer 22 of suitable thickness. Or, if the secondary emitter is inorganic it may be baked onto the surface of the face plate 16c in accordance with the manufacturing techniques employed in fabricating "ceramic" type lamp units. Any combination of the materials or mixtures thereof listed in connection with the embodiment shown in Fig. 1 above may be utilized as primary and secondary emitters. It will be understood in this and the other embodiments that where a UV-generating primary emitter is utilized the electrode 14c and face plate 16c will be fabricated from material pervious to such radiations and in this sense may be termed "radiation-transmitting."

EMBODIMENT V

As shown in Fig. 5, an area-type light source 10d similar to that described in the preceding embodiment of Fig. 4 above may be utilized, but instead of the secondary emitter being deposited in the form of a continuous layer, a plurality of secondary-emitting substances having different emission characteristics are applied to various portions of the face plate 16d according to a preselected design. For purposes of illustration, the secondary-emitting coatings are here shown as comprising a plurality of evenly-spaced bars or strips 24, 26, 28, 30, 32 and 34 but it will be appreciated that they may be applied to provide any surface-type indicia or pattern desired.

While any combination of primary and secondary emitters given relative to the embodiment of Fig. 1 may be employed, the primary emitting-dielectric layer 12d is here shown as emitting in the blue spectral region, the primary emitter being electroluminescent zinc sulfide activated by copper for example, whereas the strips contain secondary emitting substances or mixtures thereof which are excited by the blue primary radiations to fluoresce in the respective colors indicated. Specific examples of materials which may be utilized as secondary emitters and admixed with a suitable binding material to provide coatings which emit in the various colors illustrated when excited by blue light are as follows:

Table II

| Strip No.—Emission Color | Secondary Emitting Material(s) |
|---|---|
| 24—red | magdala red. |
| 26—orange | magdala red and auramine (base). |
| 28—yellow | rhodamine G and auramine (base). |
| 30—yellow-green | auramine. |
| 32—green | thioflavine. |
| 34—white | magdala red, auramine and primuline. |

Blue light, of course, may be obtained in the present instance by merely providing uncoated sections on the face plate 16d through which the primary radiations may pass. As will be obvious, any design or combination of colors may be obtained thus providing an exceedingly simple and convenient means of forming a multicolor indicium especially suited for decorative or advertising purposes, such as billboards or the like.

EMBODIMENT VI

Alternatively and as shown in Fig. 6, the blue-responding primary emitter-dielectric layer 12d and ordinary glass face plate 16d used in connection with the embodiment shown in Fig. 5 above, may be replaced by a UV-generating primary emitter-dielectric layer 12e and a face plate 36 fabricated from an optical-filter-type glass which transmits only those radiations in the UV or near UV portions of the spectrum. A specific example of such a UV-generating electroluminescent material is boron-nitride (see Embodiment I). Glasses of this type are well-known in the art, a specific example being a nickel-oxide containing glass sold by the Corning Glass Works, Corning, New York, under the trade designation "Corning Filter No. 5840." In the present instance, secondary emitters which fluoresce under UV excitation in the colors desired will, of course, be utilized in the layers 38.

An important advantage of this combination is that light will emanate only from those portions of the face plate 36 which are coated with secondary emitting layers 38 since all the visible primary radiations will be absorbed. In addition to the greater flexibility afforded by this arrangement, a more striking colored effect will be produced since there is a complete absence of any visible primary radiations which could, if inadvertently transmitted, deleteriously dilute the purity or color-saturation of the secondary radiations.

EMBODIMENT VII

As illustrated in Fig. 7, the area-type light source 10f may be fabricated by utilizing elongated electrodes 11f and 14f of opaque material arranged to form an interlinking grid-like mat having light-transmissive interstices. The primary and secondary emitters may be admixed and applied in the form of an overlying layer 12f as here illustrated or may be arranged in accordance with any of the embodiments above-described, depending on the effects desired and the nature of the emitting materials employed. A face plate 16f of suitable insulating and light-transmitting material such as glass or plastic is preferably placed on the other side of the grid-like electrode assembly to serve as a protective member and firmly hold the electrode elements in proper position. With this type of construction, however, a resistance or other suitable ballast element 40 is desirably inserted in the A.C. power circuit in order to prevent the high-voltage surge generated during the energization and the de-energization of the cell by virtue of the capacitive effect of the grid-like electrode structure from causing a destructive arc across adjacent portions of the electrode network. The foregoing and similar grid-type cell structures may be fabricated in the manner described in U.S. Patent No. 2,765,419 to S. Roberts and U.S. Patent No. 2,768,310 to B. Kazen et al.

FABRICATION

While each of the light sources above-described may be fabricated in accordance with the well-known techniques employed in the manufacture of electroluminescent cell structures, for optimum results it has been found desirable to disperse the primary and secondary emitters in a suitable plastic dielectric material, such as polyvinyl-chloride acetate for example, and, by means of thinners known in the trade, form a paint or lacquer of such consistency that the emitter may be applied in thin coats of varying density. As a specific example, equal proportions by weight of field-responsive phosphor and dielectric material may be used in fabricating any of the foregoing cell constructions. This proportion may vary considerably and is only given by way of example. The secondary emitter, that is the fluorescent substance, may be used in equal proportions by weight with the field-responsive phosphor material, although the relative proportions may vary over a wide range, if desired, depending upon the degree of absorption and conversion of the primary radiation required and the type of structure employed. If the fluorescent material is to be admixed with a dielectric and includes as a separate layer, the proportions by weight of the fluorescent material and dielectric material may be equal, for example.

The primary and secondary emitter-bearing lacquers may be combined, as in the embodiment shown and described relative to Fig. 1, or applied separately, as shown and described relative to the embodiments of Figs. 2, 4, 5 and 6. In either case, the emitter-dielectric lacquer is sprayed or otherwise applied to the face plate and air cured to form a layer about 10 microns in thickness. The operation is repeated until the thickness of the coating is in the range of approximately 25 to 75 microns or more, depending on the breakdown-voltage rating and secondary-emitter concentration desired. It has been found that a coating of this character having a thickness of about 25 microns will safely withstand 120 volts without electrically breaking down whereas a coating thickness of about 75 microns is sufficient for 600 volt operation. The voltage rating of the area-type source may, of course, be increased by depositing a clear layer of plastic in addition to the emitting layers, particularly if the clear layer is disposed in juxtaposed relation with the metal electrode.

In contrast to the "plastic" type lamp above-described, the primary and secondary emitters may be singly or collectively embedded in a suitable glass to provide a "ceramic" type construction, providing of course, that the emitting substances selected are able to withstand the intense heats employed in fabrication.

While the invention has been described in conjunction with an area-type source of rigid construction and electroluminescent phosphor materials capable of low or variable-frequency excitation, it will be obvious that it is equally adaptable to a flexible electroluminescent laminated structure such as that described in U.S. Patent No. 2,774,004 to M. S. Jaffe or U. S. Patent No. 2,733,367 to J. L. Gillson, Jr. and to any electroluminescent material regardless of its excitation characteristics. It will also be appreciated that although the electrodes in the embodiments as shown and described relative to Figs. 1 to 6, inclusive, were referred to as being generally flat as regards configuration, the term "flat" is used in its broad sense and hence applies to all types of surfaces that extend over an appreciable two-dimensional area even though the contour of the surface per se is rounded, angular, etc.

It will be apparent from the foregoing that the objects of the invention have been achieved by providing an area-type light source wherein electroluminescent radiations, particularly those generated under low or variable-frequency field excitation, are efficiently converted by a fluorescent material into radiations in preselected longer wavelength regions of the visible spectrum, especially red. In addition, by properly combining carefully selected materials, the phenomena of electroluminescence and photoluminescence are advantageously coupled and the attendant interaction utilized to provide a method of efficiently and conveniently producing from a substantially area-type source, color-corrected white light or colored light of a character and brightness heretofore unattainable by electroluminescent materials alone.

Although one preferred and several alternative embodiments of this invention have been described according to the patent statutes, it will be understood that further modifications and variations may be made without departing from the spirit and scope of the invention.

I claim:

1. An area-type light source comprising two spaced electrodes at least one of which is radiation-transmitting, a layer comprising field-responsive phosphor between said electrodes, said field-responsive phosphor under the influence of an alternating electric field of varying frequency having a band emission the predominant wavelength whereof varies with changes in the frequency of the exciting field and is shorter than a preselected wavelength in the visible spectrum, and a layer comprising fluorescent material in receptive proximity to and coextensive relation with said field-responsive phosphor that absorbs and converts some of the radiations generated by said field-responsive phosphor into radiation of a wavelength at least equal to the aforesaid preselected wavelength and transmits the remainder of said radiations generated by said field-responsive phosphor, whereby said source emits light different in color from that produced by said field-responsive phosphor and which would normally be transmitted at a given frequency of the applied electric field.

2. The combination which comprises, an electroluminescent device including a pair of spaced electrodes having an electroluminescent phosphor therebetween which under the influence of an alternating electric field of varying frequency emits a band of radiations the predominant wavelength whereof varies with changes in the frequency of the exciting electric field but does not exceed a preselected wavelength, and a secondary emitting substance in receptive and coextensive relation with said electroluminescent phosphor, said secondary emitting substance comprising a mixture of fluorescent materials having absorption and emission spectra such that the shorter-wavelength radiations generated by said electroluminescent phosphor will be absorbed by one of said fluorescent materials and converted to radiations of approximately the same wavelength as the longer-wavelength radiations generated by said electroluminescent phospor, whereas another of said fluorescent materials will absorb the longer-wavelength radiations generated by said electroluminescent phosphor and the radiations emitted by said one fluorescent material and convert these absorbed radiations into visible radiations of still longer-wavelength greater than said preselected wavelength, whereby radiations generated by said electroluminescent phosphor are sequentially converted into radiations in a preselected region of the visible spectrum regardless of the frequency of the exciting electric field.

3. The combination which comprises, an electroluminescent device including an electroluminescent phosphor which under the influence of an alternating electric field of varying frequency emits a band of visible radiations the predominant wavelength whereof varies with changes in the frequency of the exciting electric field but does not exceed a preselected wavelength, and a secondary emitting substance in receptive coextensive relation with said electroluminescent phosphor, said secondary emitting substance comprising a fluorescent material which absorbs some of the radiations generated by said electroluminescent phosphor and converts these absorbed radiations into radiations of a wavelength longer than said preselected wavelength, and transmits other radiations generated by said electroluminescent phosphor, whereby a part of the light output of said electroluminescent device is transposed to a different portion of the visible spectrum and blended with the transmitted electroluminescent radiations to produce in response to variations in the frequency of the exciting electric field a color shift different from that normally exhibited by said electroluminescent device.

4. In combination, an electroluminescent device of the type that emits a band of radiations the predominant wavelength whereof and thus the predominant color of the light produced by said electroluminescent device varies with changes in the character of the applied electric field, and a secondary emitting substance in receptive proximity to the radiations produced by said electroluminescent device, said secondary emitting substance comprising a fluorescent material that transmits some of the electroluminescent radiations but absorbs other electroluminescent radiations and converts them into secondary radiations of longer wavelength and is adapted thereby to transpose a part of the output of said electroluminescent device to a different region of the spectrum and, by virtue of the blending of the transmitted electroluminescent radiations and emitted secondary radiations, produce a resultant emission and color shift different from those normally generated and exhibited, respectively, by said electroluminescent device.

5. In combination, an electroluminescent device of the type that emits a band of radiations the predominant wavelength whereof and thus the predominant color of the light produced by said electroluminescent device varies with changes in the character of the applied electric field, and a secondary emitting substance in receptive proximity to the radiations produced by said electroluminescent device, said secondary emitting substance comprising at least two fluorescent materials in receptive proximity to one another and having absorption and emission spectra such that the shorter-wavelength radiations produced by said electroluminescent device will be absorbed by one of said fluorescent materials and converted thereby into secondary radiations of approximately the same wavelength as the longer-wavelength radiations produced by said electroluminescent device, and the other of said fluorescent materials will absorb the longer-wavelength radiations produced by said electroluminescent device and the secondary radiations emitted by said one fluorescent material and convert such absorbed radiations into tertiary radiations of still longer-wavelength, thereby sequentially converting the radiations produced by said electroluminescent device and transposing the light output of said device to a preselected region of the visible spectrum regardless of changes in the character of the exciting electric field.

6. In combination, an electroluminescent device including an electroluminescent phosphor which under the influence of an alternating electric field of varying frequency emits a band of radiations the predominant color whereof shifts from green to blue as the frequency of the applied electric field is increased, and a secondary emitting substance in receptive proximity to said electroluminescent phosphor, said secondary emitting substance comprising a fluorescent material adapted to selectively convert some of the radiations generated by said electroluminescent phosphor to secondary radiations mainly in the red region of the spectrum and transmit other electroluminescent radiations and thereby effect a blending of transmitted and secondary radiations such that the normal green-blue shift of the electroluminescent phosphor incident with increasing frequency of the applied electric field is transposed to a different region of the spectrum and broadened to produce an emission that varies in color from yellowish-white through color-corrected white to lavender as the frequency of the applied field is increased.

7. In combination, an electroluminescent device of the type that emits a band of radiations the predominant wavelength whereof and thus the predominant color of the light produced by said device changes with variations in the character of the exciting electric field but does not extend into the red region of the spectrum, and a secondary emitting substance in receptive proximity to said electroluminescent phosphor, said secondary emitting substance comprising at least two fluorescent materials in receptive proximity to one another and having absorption and emission spectra such that together they span the emission band of said electroluminescent device, one of said fluorescent materials being adapted to absorb and convert the shorter wavelength electroluminescent radiations into radiations of approximately the same wavelength as the longer-wavelength radiations produced by said electroluminescent phosphor, and the other of said fluorescent materials being adapted to absorb the longer wavelength electroluminescent radiations and the radiations emitted by the said one fluorescent material and convert such absorbed radiations into radiations mainly in the red region of the spectrum, thereby sequentially converting at least a portion of the variable-color emission of said electroluminescent device into red light regardless of changes in the character of the exciting electric field.

8. In combination, an electroluminescent device including a pair of spaced electrodes having an electro-luminescent phosphor therebetween which under the influence of an electric field emits a band of radiations the predominant wavelength whereof and thus the resultant color of the light produced by said device varies with changes in the character of the exciting electric field, and a secondary emitting substance in receptive proximity to said electroluminescent phosphor and adapted to selectively transmit and convert radiations generated thereby and transpose at least a portion of the light output of said electroluminescent device to longer-wavelength radiations of a different color, said secondary emitting substance comprising at least one fluorescent material that is admixed with said electroluminescent phosphor.

9. In combination, an electroluminescent device including a pair of spaced electrodes, at least one of which is light-transmitting, having an electroluminescent phosphor therebetween which under the influence of an electric field emits a band of radiations the predominant wavelength whereof and the resultant color of the light produced by said device varies with changes in the character of the exciting electric field, and a secondary emitting substance in receptive proximity to said electroluminescent phosphor and adapted to selectively transmit and convert radiations generated thereby and transpose at least a portion of the light output of said electroluminescent device to longer-wavelength radiations of a different color, said secondary emitting substance comprising at least one fluorescent material disposed between said electroluminescent phosphor and said light-transmitting electrode.

10. In combination, an electroluminescent device having a light-emitting face and including a pair of spaced electrodes and an electroluminescent phosphor which under the influence of an electric field emits a band of radiations the predominant wavelength whereof and thus the resultant color of the light produced by said device varies with changes in the character of the exciting electric field, and a secondary emitting substance in receptive proximity to said electroluminescent phosphor and adapted to selectively transmit and convert radiations generated thereby and transpose at least a portion of the light output of said electroluminescent device to longer-wavelength radiations of a different color, said secondary emitting substance comprising a fluorescent glass member located proximate and covering at least a portion of the light-emitting face of said electroluminescent device.

11. In combination, an electroluminescent device having a light-emitting face and including a pair of spaced electrodes and an electroluminescent phosphor which under the influence of an electric field emits a band of radiations the predominant wavelength whereof and thus the resultant color of the light produced by said device varies with changes in the character of the exciting electric field, and a secondary emitting substance in receptive proximity to said electroluminescent phosphor and adapted to selectively transmit and convert radiations generated thereby and transpose at least a portion of the light output of said electroluminescent device to longer-wavelength radiations of a different color, said secondary emitting substance comprising a quantity of fluorescent material on the outer surface of the light-emitting face of said electroluminescent device.

12. In combination, an electroluminescent device having a light-emitting face and including a pair of spaced electrodes and an electroluminescent phosphor which under the influence of an electric field emits a band of radiations the predominant wavelength whereof and the resultant color of the light produced by said device varies with changes in the character of the exciting electric field, and a plurality of secondary emitting substances in receptive proximity to said electroluminescent phosphor and each adapted to selectively absorb radiations generated thereby and convert said absorbed radiations into longer-wavelength radiations of different and preselected color, each of said secondary emitting substances comprising a quantity of fluorescent material disposed on preselected segments of the light-emitting face of said device and geometrically arranged to form a multicolor indicia.

13. In combination, an electroluminescent device having a band emission the predominant wavelength whereof varies with changes in the character of the exciting electric field, and a secondary emitting substance in receptive proximity to radiations produced by said electroluminescent device, said secondary emitting substance comprising a fluorescent material that absorbs some of the electroluminescent radiations and converts them into secondary radiations of longer wavelength and is adapted thereby to transpose part of the output of said electroluminescent device to a different region of the spectrum and produce an emission different from that normally generated by said electroluminescent device.

14. In combination, an electroluminescent device having a band emission the predominant wavelength whereof varies with changes in the character of the exciting electric field, and a secondary emitting substance in receptive proximity to radiations produced by said electroluminescent device, said secondary emitting substance comprising at least two fluorescent materials in receptive proximity to one another and having absorption and emission spectra such that at least some of the shorter-wavelength radiations produced by said electroluminescent device will be absorbed by one of said fluorescent materials and be converted thereby into secondary radiations of longer wavelength, and the other of said fluorescent materials will absorb some of the longer-wavelength radiations produced by said electroluminescent device and some of the secondary radiations emitted by said one fluorescent material and convert such absorbed radiations into radiations of still longer wavelength, thereby transforming part of the output of said electroluminescent device into an emission of a preselected wavelength regardless of changes in the character of the exciting electric field.

References Cited in the file of this patent
UNITED STATES PATENTS

| | | |
|---|---|---|
| 2,413,940 | Bickford | Jan. 7, 1947 |
| 2,424,454 | Gordon | July 22, 1947 |
| 2,494,883 | Kroger et al. | Jan. 17, 1950 |
| 2,624,857 | Marger | Jan. 6, 1953 |
| 2,650,310 | White | Aug. 25, 1953 |
| 2,692,349 | Ouweltjes | Oct. 19, 1954 |
| 2,730,644 | Micklin | Jan. 10, 1956 |
| 2,733,367 | Gillson | Jan. 31, 1957 |
| 2,783,407 | Vierkotter | Feb. 26, 1957 |